(12) United States Patent
Kim et al.

(10) Patent No.: US 11,936,029 B2
(45) Date of Patent: Mar. 19, 2024

(54) VEHICULAR HEAT MANAGEMENT SYSTEM

(71) Applicant: Hanon Systems, Daejeon (KR)

(72) Inventors: Doo Hoon Kim, Daejeon (KR); Hyeon Gyu Kim, Daejeon (KR); Kyung Ju An, Daejeon (KR); Jin Jae Lee, Daejeon (KR); Joong Man Han, Daejeon (KR)

(73) Assignee: Hanon Systems, Daejeon (KR)

( * ) Notice: Subject to any disclaimer, the term of this patent is extended or adjusted under 35 U.S.C. 154(b) by 213 days.

(21) Appl. No.: 17/436,834

(22) PCT Filed: Feb. 26, 2020

(86) PCT No.: PCT/KR2020/002722
§ 371 (c)(1),
(2) Date: Sep. 7, 2021

(87) PCT Pub. No.: WO2020/184869
PCT Pub. Date: Sep. 17, 2020

(65) Prior Publication Data
US 2022/0181722 A1 Jun. 9, 2022

(30) Foreign Application Priority Data

Mar. 8, 2019 (KR) .................. 10-2019-0026662
Mar. 8, 2019 (KR) .................. 10-2019-0026666

(51) Int. Cl.
*H01M 10/663* (2014.01)
*B60H 1/00* (2006.01)
(Continued)

(52) U.S. Cl.
CPC ...... *H01M 10/663* (2015.04); *B60H 1/00278* (2013.01); *B60H 1/00285* (2013.01);
(Continued)

(58) Field of Classification Search
CPC ............ H01M 10/663; H01M 10/613; H01M 10/625; H01M 10/6556; H01M 10/6568;
(Continued)

(56) References Cited

U.S. PATENT DOCUMENTS 10,766,338 B2 * 9/2020 Oh ...................... B60H 1/00278
11,088,408 B2 * 8/2021 Takazawa ......... H01M 10/6568
(Continued)

FOREIGN PATENT DOCUMENTS

JP 2005153683 A 6/2005
KR 20130044875 A 5/2013
(Continued)

OTHER PUBLICATIONS

Machine Translation KR 20180003985A (Year: 2018).*
(Continued)

*Primary Examiner* — Len Tran
*Assistant Examiner* — Gustavo A Hincapie Serna
(74) *Attorney, Agent, or Firm* — Norton Rose Fulbright US LLP; James R. Crawford (57) ABSTRACT

A vehicular heat management system for individually cooling and heating a plurality of air conditioning regions of a vehicle includes a plurality of refrigerant circulation lines configured to cool and heat the air conditioning regions individually shared by the refrigerant circulation lines. The refrigerant circulation lines are provided with one or more air conditioning units for individually cooling and heating the respective air conditioning regions, and are configured to supply a refrigerant to the corresponding air conditioning units to individually cool and heat the air conditioning regions corresponding to the air conditioning units.

1 Claim, 4 Drawing Sheets

PRIOR ART (51) Int. Cl.
*B60L 58/26* (2019.01)
*H01M 10/613* (2014.01)
*H01M 10/625* (2014.01)
*H01M 10/6556* (2014.01)
*H01M 10/6568* (2014.01)

(52) U.S. Cl.
CPC .......... *B60H 1/00885* (2013.01); *B60L 58/26* (2019.02); *H01M 10/613* (2015.04); *H01M 10/625* (2015.04); *H01M 10/6556* (2015.04); *H01M 10/6568* (2015.04); *B60H 2001/00307* (2013.01); *B60H 2001/00928* (2013.01); *H01M 2220/20* (2013.01)

(58) Field of Classification Search
CPC .......... H01M 2220/20; B60H 1/00278; B60H 1/00285; B60H 1/00885; B60H 2001/00307; B60H 2001/00928; B60L 58/26; B60L 2240/34; B60L 2240/545; B60K 11/02; F01P 7/14; F01P 7/16
USPC .......................................................... 62/244
See application file for complete search history.

(56) References Cited

U.S. PATENT DOCUMENTS

| | | | | |
|---|---|---|---|---|
| 2012/0234518 A1* | 9/2012 | Brodie | ................. | F28D 20/028 165/104.31 |
| 2016/0107501 A1* | 4/2016 | Johnston | ............ | B60H 1/00278 165/41 |
| 2018/0178615 A1* | 6/2018 | Xia | ..................... | H01M 10/486 |
| 2018/0208014 A1* | 7/2018 | Ben Ahmed | ......... | B60H 1/3211 |
| 2018/0339570 A1* | 11/2018 | Lee | .................... | B60H 1/00278 |
| 2019/0009635 A1* | 1/2019 | Oh | ...................... | B60H 1/2221 |
| 2019/0047361 A1* | 2/2019 | Lee | .................... | B60H 1/00885 |
| 2019/0176563 A1* | 6/2019 | Kim | .................. | B60H 1/00885 |
| 2019/0176572 A1* | 6/2019 | Kim | .................. | B60H 1/00428 |
| 2019/0291540 A1* | 9/2019 | Gutowski | .......... | B60H 1/00278 |
| 2020/0031194 A1* | 1/2020 | Lee | .................... | B60H 1/00278 |
| 2020/0180390 A1* | 6/2020 | Kim | .................. | B60H 1/00278 |
| 2020/0180391 A1* | 6/2020 | Kim | .................. | B60H 1/3223 |
| 2020/0180392 A1* | 6/2020 | Lee | ..................... | B60H 1/143 |
| 2020/0274210 A1* | 8/2020 | Bae | .................... | H01M 10/486 |
| 2021/0221199 A1* | 7/2021 | Lee | .................... | B60H 1/32284 |
| 2022/0041031 A1* | 2/2022 | Huang | .................. | B60W 10/08 |
| 2022/0097567 A1* | 3/2022 | Lian | .................... | H01M 10/486 |

FOREIGN PATENT DOCUMENTS

| | | | | |
|---|---|---|---|---|
| KR | 20180003985 A | * | 1/2018 | |
| KR | 20180003985 A | | 1/2018 | |
| KR | 20180065311 A | | 6/2018 | |
| KR | 20180131665 A | | 12/2018 | |
| WO | WO-2016194143 A1 | * | 12/2016 | ................ F25B 1/10 |
| WO | WO-2018149703 A1 | * | 8/2018 | ......... B60H 1/32284 |

OTHER PUBLICATIONS

Machine Translation WO2016194143A1 (Year: 2016).*
International Search Report issued in PCT/KR2020/002722 dated Jun. 5, 2020.

* cited by examiner

VEHICULAR HEAT MANAGEMENT SYSTEM

CROSS REFERENCE TO RELATED APPLICATIONS

This application is a national phase under 35 U.S.C. § 371 of International Application No. PCT/KR2020/002722 filed on Feb. 26, 2020, which claims the benefit of priority to Korean Patent Application Nos. 10-2019-0026662 filed on Mar. 8, 2019 and 10-2019-0026666 filed on Mar. 8, 2019. The entire contents of these applications are incorporated herein by reference in their entirety.

TECHNICAL FIELD

The present invention relates to a vehicular heat management system and, more particularly, to a vehicular heat management system capable of improving the cooling and heating performance of each air conditioning unit by supplying a sufficient amount of refrigerant to each air conditioning unit that individually cools and heats each air conditioning region, and capable of improving the cooling efficiency of a battery module by sufficiently lowering the temperature of the cooling water circulated to the battery module.

BACKGROUND ART

Examples of an eco-friendly vehicle include an electric vehicle, a hybrid vehicle and a fuel cell vehicle (hereinafter collectively referred to as a "vehicle").

Figure 1:
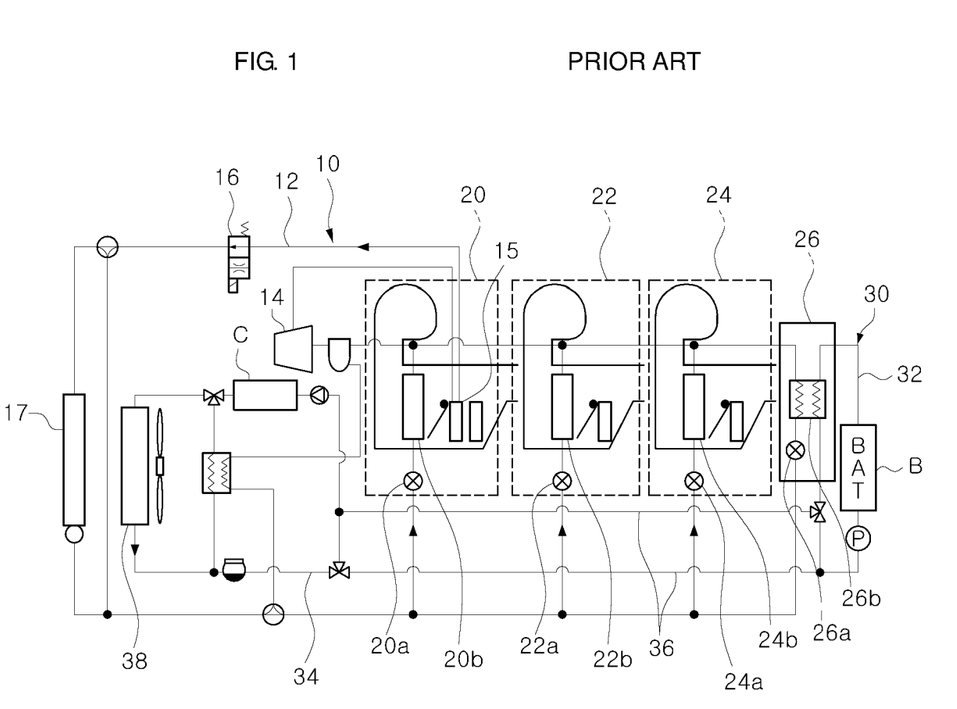
FIG. 1 is a view showing a conventional vehicular heat management system.

As shown in FIG. 1, such a vehicle is equipped with an air conditioner 10 for cooling and heating air conditioning regions of the vehicle and objects to be cooled.

In recent years, the air conditioner 10 has an individual cooling and heating structure that individually cools and heats a plurality of air conditioning regions and objects to be cooled. For example, the air conditioner 10 has a structure for independently cooling and heating a front seat part, a rear seat left part, a rear seat right part, and vehicle's electric components in a passenger compartment.

The individual air conditioner 10 is of a heat pump type and is provided with a refrigerant circulation line 12. The individual air conditioner 10 includes a compressor 14, a high-pressure side heat exchanger 15, a heating mode expansion valve 16, an outdoor heat exchanger 17, a front seat air conditioning unit 20, a rear seat left air conditioning unit 22, a rear seat right air conditioning unit 24 and an electric component air conditioning unit 26, wherein the air conditioning units 20, 22, 24 and 26 are installed in parallel with each other.

In particular, the front seat air conditioning unit 20, the rear seat left air conditioning unit 22, the rear seat right air conditioning unit 24 and the electric component air conditioning unit 26 are used to cool and heat a front seat part, a rear seat left part, a rear seat right part, and electric components of the vehicle, for example, an electric component module C and a battery module B, respectively, and include cooling mode expansion valves 20a, 22a, 24a and 26a and low-pressure side heat exchangers 20b, 22b, 24b and 26b, respectively.

The refrigerant circulation line 12 opens the heating mode expansion valve 16 in an air conditioner mode, so that the refrigerant can be circulated without passing through the heating mode expansion valve 16.

By way of this refrigerant circulation, a low-temperature cold air is generated in the respective low-pressure side heat exchangers 20b, 22b, 24b and 26b of the front seat air conditioning unit 20, the rear seat left air conditioning unit 22, the rear seat right air conditioning unit 24 and the electric component air conditioning unit 26. The generated cold air is supplied to the front seat part, the rear seat left part, the rear seat right part, the electric component module C and the battery module B, respectively. Accordingly, the front seat part, the rear seat left part, the rear seat right part, the electric component module C and the battery module B are cooled.

In this regard, the electric component air conditioning unit 26 transfers the cold air generated in the low-pressure side heat exchanger 26b to the cooling water circulation line 30 in a water-cooled manner to indirectly cool the electric component module C and the battery module B.

The cooling water circulation line 30 includes a battery module side cooling water circulation line part 32 for cooling the battery module B and an electric component module side cooling water circulation line part 34 for cooling the electric component module C, and connecting lines 36 for connecting these two cooling water circulation line parts 32 and 34 into one.

The cooling water circulation line 30 circulates cooling water between the low-pressure side heat exchanger 26b of the electric component air conditioning unit 26 and the electric component module C and the battery module B.

Accordingly, the cold air received from the low-pressure side heat exchanger 26b of the electric component air conditioning unit 26 is circulated between the electric component module C and the battery module B, thereby cooling the electric component module C and the battery module B.

On the other hand, in the heating mode or when the air conditioner 10 is turned off, the supply of refrigerant to the respective air conditioning units 20, 22, 24 and 26 is limited to thereby limit the cooling actions of the respective air conditioning units 20, 22, 24 and 26.

In particular, the cooling action of the electric component air conditioning unit 26 is limited. Due to the cooling action limiting structure of the electric component air conditioning unit 26, the cooling actions for the battery module B and the electric component module C are limited in the heating mode or when the air conditioner 10 is turned off.

Therefore, in the heating mode or when the air conditioner 10 is turned off, the cooling water in the cooling water circulation line 30 circulating between the battery module B and the electric component module C is cooled by a radiator 38.

Accordingly, in the heating mode or when the air conditioner 10 is turned off, the cooling water cooled by the radiator 38 is circulated through the battery module B and the electric component module C to cool the battery module B and the electric component module C.

As a result, it is possible to cool the battery module B and the electric component module C despite the limitation of the cooling action of the electric component air conditioning unit 26.

However, the conventional individual air conditioner 10 has a drawback in that the battery module B is not sufficiently cooled in the process in which the cooling water of the cooling water circulation line 30 circulating between the battery module B and the electric component module C is cooled by the radiator 38 to cool the battery module B and the electric component module C.

In particular, the heat generation temperature of the electric component module C is relatively high compared to the heat generation temperature of the battery module B. There is a disadvantage that the cooling water that has absorbed the heat of the battery module B having a relatively low temperature is additionally heated while being circulated through the electric component module C having a relatively high temperature.

Thus, there is a problem that when the cooling water passed through the electric component module C is not sufficiently cooled while passing through the radiator 38. This leads to a disadvantage that the battery module B is not sufficiently cooled even though the cooling water passed through the radiator 38 is circulated through the battery module B while returning to the battery module side cooling water circulation line part 32. As a result, there is a problem that the cooling efficiency of the battery module B is very low.

In addition, since the conventional individual air conditioner 10 has a structure in which the respective air conditioning units 20, 22, 24 and 26 are connected in parallel to one refrigerant circulation line 12, there is a disadvantage in that the refrigerant has to be supplied to all of the air conditioning units 20, 22, 24 and 26 with one compressor 14 installed on the refrigerant circulation line 12.

Thus, there is a problem that a sufficient amount of refrigerant is not supplied to the respective air conditioning units 20, 22, 24 and 26, as a result of which the cooling performance of the respective air conditioning units 20, 22, 24 and 26 is lowered.

In addition, there is a disadvantage that an excessive load is applied to the compressor 14 in the process of supplying the refrigerant to the respective air conditioning units 20, 22, 24 and 26 with one compressor 14. This leads to a problem that the durability of the compressor 14 is deteriorated, the lifespan thereof is reduced, and the compressor 14 is prematurely malfunctioned and damaged.

SUMMARY

In view of the aforementioned problems inherent in the related art, it is an object of the present invention to provide a vehicular heat management system capable of enhancing the cooling efficiency of cooling water in a cooling water circulation line by improving the cooling water flow and cooling structure of the cooling water circulation line.

Another object of the present invention is to provide a vehicular heat management system capable of sufficiently lowering the temperature of the cooling water circulating through a battery module and consequently improving the cooling efficiency of the battery module by enhancing the cooling efficiency of cooling water in the cooling water circulation line.

A further object of the present invention is to provide a vehicular heat management system capable of supplying a sufficient amount of refrigerant to respective air conditioning units by improving the refrigerant supply structure for the respective air conditioning units.

A still further object of the present invention is to provide a vehicular heat management system capable of improving the cooling and heating performance of the respective air conditioning units and consequently improving the cooling and heating performance for respective air conditioning regions of a vehicle by adopting the configuration capable of supplying a sufficient amount of refrigerant to the respective air conditioning units.

A yet still further object of the present invention is to provide a vehicular heat management system capable of reducing an operation load applied to a compressor without reducing the cooling and heating performance by improving the refrigerant supply structure for the respective air conditioning units.

An even yet still further object of the present invention is to provide a vehicular heat management system capable of improving the durability of a compressor, reducing the risk of malfunction and damage to the compressor, and prolonging the lifespan of the compressor by adopting the configuration capable of reducing the operation load applied to the compressor without reducing the cooling and heating performance.

According to one aspect of the present invention, there is provided a vehicular heat management system for individually cooling and heating a plurality of air conditioning regions of a vehicle, including: a plurality of refrigerant circulation lines configured to cool and heat the air conditioning regions individually shared by the refrigerant circulation lines, wherein the refrigerant circulation lines are provided with one or more air conditioning units for individually cooling and heating the respective air conditioning regions, and are configured to supply a refrigerant to the corresponding air conditioning units to individually cool and heat the air conditioning regions corresponding to the air conditioning units.

In the system, the refrigerant circulation lines may include a first refrigerant circulation line for cooling and heating a front seat part in a passenger compartment and cooling electric components of the vehicle, and a second refrigerant circulation line for cooling and heating a rear seat left part and a rear seat right part in the passenger compartment.

In the system, the first refrigerant circulation line may include a compressor, a high-pressure side heat exchanger, a heating mode expansion valve, an outdoor heat exchanger, a plurality of cooling mode expansion valves, and a plurality of low-pressure side heat exchangers corresponding to the cooling mode expansion valves, and the first refrigerant circulation line may be configured to, in an air conditioner mode, generate cold air in the low-pressure side heat exchangers to individually cool the front seat part and electric components corresponding to the low-pressure side heat exchangers.

In the system, the second refrigerant circulation line may include a compressor, a high-pressure side heat exchanger, a heating mode expansion valve, an outdoor heat exchanger, a plurality of cooling mode expansion valves, and a plurality of low-pressure side heat exchangers corresponding to the cooling mode expansion valves, and the second refrigerant circulation line may be configured to, in an air conditioner mode, generate cold air in the low-pressure side heat exchangers to individually cool the rear seat left part and the rear seat right part corresponding to the low-pressure side heat exchangers.

According to another aspect of the present invention, there is provided a vehicular heat management system, including: a water-cooled cooling device configured to individually cool a plurality of cooling target objects of a vehicle in a water-cooled manner, wherein the water-cooled cooling device includes cooling water circulation lines for circulating cooling water between the cooling target objects and radiators, and the cooling water circulation lines have independent cooling water circulation structures provided in a corresponding relationship with the cooling target objects so as to independently cool the cooling target objects having different heat generation temperatures.

In the system, the water-cooled cooling device may include a battery module side cooling water circulation line for circulating cooling water between a battery module and a radiator to cool the battery module, and an electric component module side cooling water circulation line for circulating cooling water between an electric component module and a radiator to cool the electric component module, and the battery module side cooling water circulation line and the electric component module side cooling water circulation line may have independent cooling water circulation structures provided in a corresponding relationship with the battery module and the electric component module so as to independently cool the battery module and the electric component module, respectively.

According to the vehicular heat management system of the present invention, the cooling water of the battery module side cooling water circulation line and the cooling water of the electric component module side cooling water circulation line are independently cooled through the separate radiators. Therefore, the battery module and the electric component module having different heat generation temperatures can be cooled by the independent cooling water circulation structures.

In addition, since the battery module and the electric component module having different heat generation temperatures can be cooled by the independent cooling water circulation structures, unlike the conventional technique in which the battery module and the electric component module are cooled at the same time through a single cooling water circulation structure, it is possible to significantly improve the cooling efficiency of the battery module and the electric component module.

Particularly, the battery module having a relatively low heat generation temperature is cooled by the independent cooling water circulation structure. Therefore, the cooling of the battery module is not affected by the electric component module having a relatively high heat generation temperature. Accordingly, it is possible to efficiently cool the battery module regardless of the electric component module.

In addition, the vehicular heat management system has the structure including a plurality of refrigerant circulation lines for cooling and heating air conditioning regions individually shared by the refrigerant circulation lines. Therefore, it is possible for the refrigerant circulation lines to share the refrigerant supply to the air conditioning units for individually cooling and heating the respective air conditioning regions.

In addition, since the refrigerant supply to the air conditioning units is shared by the refrigerant circulation lines, it is possible to supply a sufficient amount of refrigerant to the respective air conditioning units.

In addition, since the sufficient amount of refrigerant can be supplied to the respective air conditioning units, it is possible to improve the cooling and heating performance of the respective air conditioning units, thereby improving the cooling and heating performance for the respective air conditioning regions of the vehicle.

In addition, since the refrigerant supply to the air conditioning units is shared by the respective refrigerant circulation lines and the sufficient amount of refrigerant can be supplied to the respective air conditioning units, it is possible to reduce the operation load applied to the compressors of the respective refrigerant circulation lines without reducing the cooling and heating performance of the respective air conditioning units.

In addition, since the operation load applied to the compressors of the respective refrigerant circulation lines can be reduced without reducing the cooling and heating performance of the respective air conditioning units, it is possible to improve the durability of the compressors, thereby reducing the risk of malfunction and damage to the compressors and prolonging the lifespan of the compressors.

DETAILED DESCRIPTION

Preferred embodiments of a vehicular heat management system according to the present invention will now be described in detail with reference to the accompanying drawings.

Figure 2:
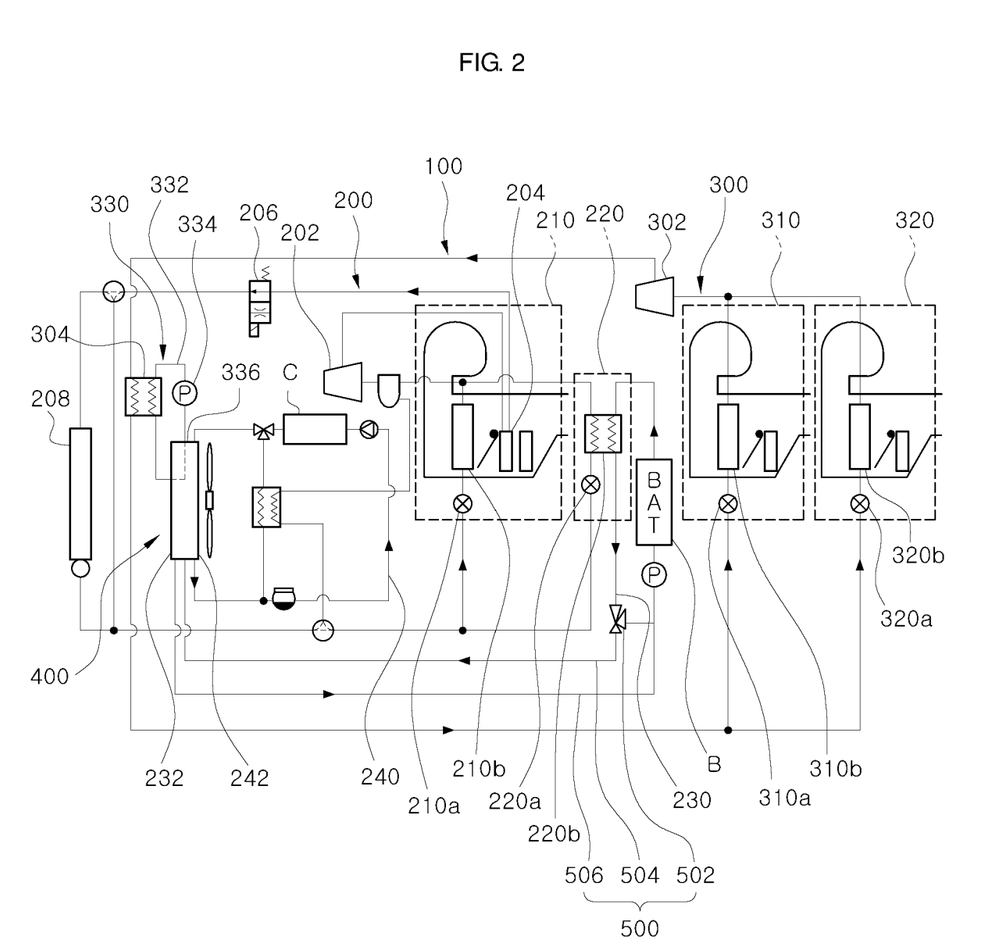
FIG. 2 is a view showing a vehicular heat management system according to one embodiment of the present invention.

Referring first to FIG. 2, the vehicular heat management system according to one embodiment of the present invention includes an air conditioner 100 for cooling and heating air conditioning regions and cooling target objects of a vehicle, wherein the air conditioner 100 includes a plurality of refrigerant circulation lines 200 and 300 for cooling and heating the air conditioning regions and the cooling target objects individually shared by the refrigerant circulation lines 200 and 300.

The refrigerant circulation lines 200 and 300 include a first refrigerant circulation line 200 for cooling and heating a front seat part in a passenger compartment, and an electric component of a vehicle, for example, a battery module B, and a second refrigerant circulation line 300 for cooling and heating a rear seat left part and a rear seat right part.

The first refrigerant circulation line 200 is of a heat pump type, and includes a compressor 202, a high-pressure side heat exchanger 204, a heating mode expansion valve 206, an outdoor heat exchanger 208, a front seat air conditioning unit 210 and an electric component air conditioning unit 220, wherein the front seat air conditioning unit 210 and the electric component air conditioning unit 220 are installed in parallel with each other.

In particular, the front seat air conditioning unit 210 and the electric component air conditioning unit 220 are used for cooling and heating a front seat part in a passenger compartment and a battery module B of vehicle, respectively, and include cooling mode expansion valves 210a and 220a and low-pressure side heat exchangers 210b and 220b, respectively.

The first refrigerant circulation line 200 opens the heating mode expansion valve 206 in an air conditioner mode, so that the refrigerant can be circulated without passing through the heating mode expansion valve 206.

By way of this refrigerant circulation, a low-temperature cold air is generated in each of the low-pressure side heat exchangers 210b and 220b of the front seat air conditioning unit 210 and the electric component air conditioning unit 220. The generated cold air is supplied to the front seat part in the passenger compartment and the battery module B to cool the front seat part and the battery module B.

In particular, the electric component air conditioning unit 220 transfers the cold air generated in the low-pressure side heat exchanger 220b to the battery module side cooling water circulation line 230 to indirectly cool the battery module B.

In this regard, the battery module side cooling water circulation line 230 circulates cooling water between the low-pressure side heat exchanger 220b of the electric component air conditioning unit 220 and the battery module B, and transfers the cold air received from the low-pressure side heat exchanger 220b of the electric component air conditioning unit 220, thereby cooling the battery module B.

Meanwhile, the battery module side cooling water circulation line 230 is further provided with a radiator 232 for cooling the cooling water discharged from the battery module B.

When the compressor 202 of the first refrigerant circulation line 200 is turned off, the radiator 232 serves to cool the battery module B instead of the electric component air conditioning unit 220 of the first refrigerant circulation line 200.

In this regard, the radiator 232 of the battery module side cooling water circulation line 230 is configured to include a common body 400 shared by the radiator 242 of the electric component module side cooling water circulation line 240 for cooling an electric component module C.

Figure 3:
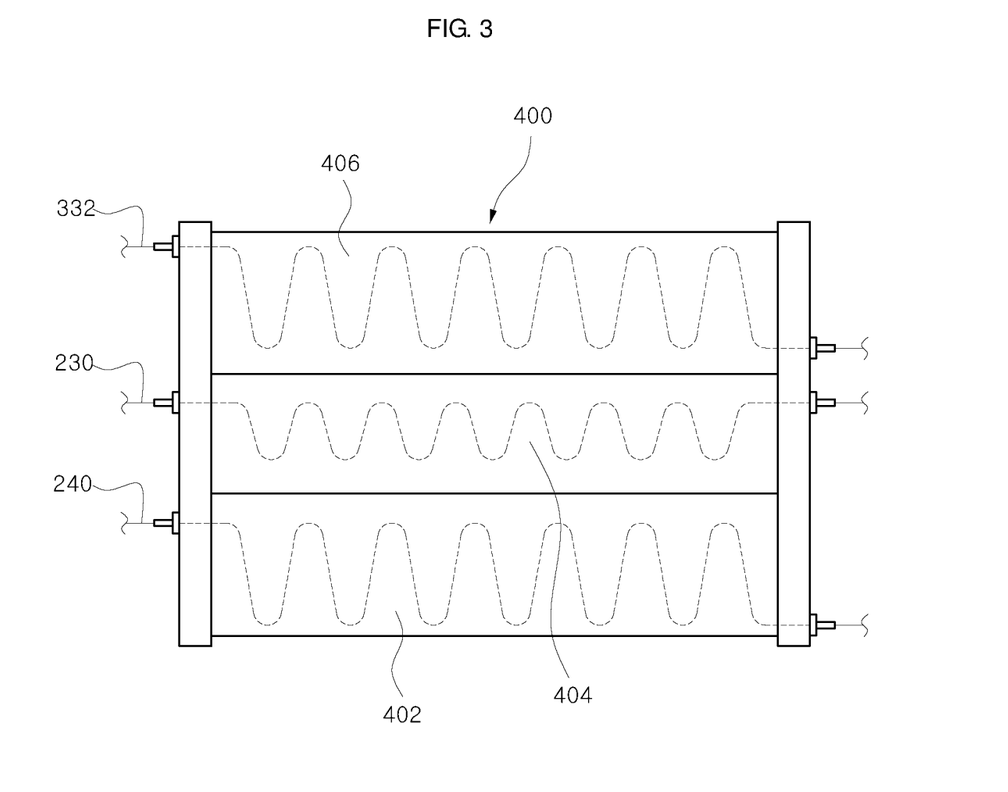
FIG. 3 is a view showing a common body of radiators that constitute the vehicular heat management system according to one embodiment of the present invention.

At this time, as shown in FIG. 3, the common body 400 includes an electric component module cooling region 402 through which the cooling water of the electric component module side cooling water circulation line 240 can circulate, and a battery module cooling region 404 through which the cooling water of the battery module side cooling water circulation line 230 can circulate.

The common body 400 individually cools the cooling water of the electric component module side cooling water circulation line 240 and the cooling water of the battery module side cooling water circulation line 230 through the respective regions 402 and 404, respectively.

Figure 4:
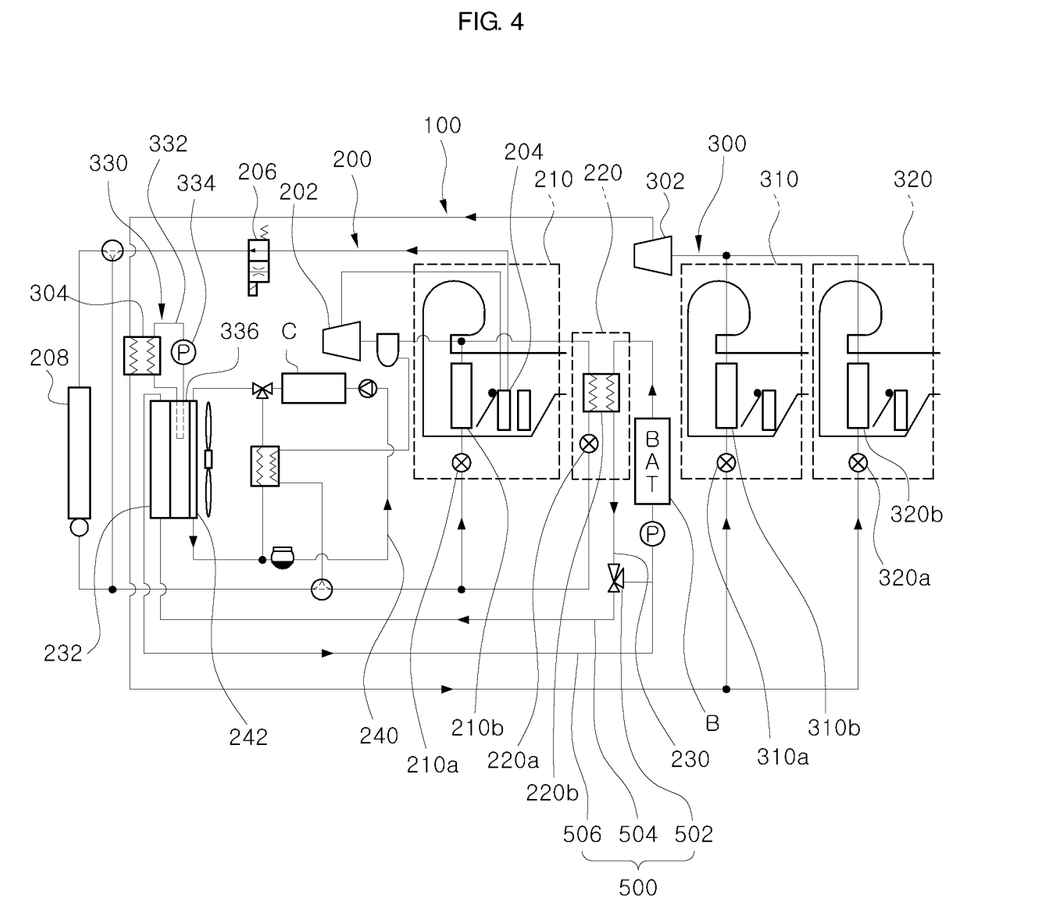
FIG. 4 is a view showing a vehicular heat management system according to another embodiment of the present invention.

In some cases, as shown in FIG. 4, the radiator 232 of the battery module side cooling water circulation line 230 may be configured as a separate body with respect to the radiator 242 of the electric component module side cooling water circulation line 240.

Referring again to FIG. 2, the vehicular heat management system according to one embodiment of the present invention further includes a cooling water flow control part 500 that selectively circulates the cooling water from the battery module side cooling water circulation line 230 to the radiator 232 as needed.

The cooling water flow control part 500 includes a bypass valve 502 for bypassing the cooling water of the battery module side cooling water circulation line 230 discharged from the battery module B, an introduction line 504 for introducing the bypassed cooling water to the radiator 232, and a return line 506 for returning the cooling water passed through the radiator 232 back to the inlet side of the battery module B.

In particular, the bypass valve 502 bypasses the cooling water of the battery module side cooling water circulation line 230 toward the radiator 232 when the refrigerant of the air conditioner 100 cannot be used, for example, when the air conditioner 100 is turned off.

Accordingly, when the refrigerant of the air conditioner 100 cannot be used, the cooling water of the battery module side cooling water circulation line 230 is cooled while being circulated toward the radiator 232, and the cooling water cooled in this way is introduced into the battery module B to cool the battery module B.

Meanwhile, the bypass valve 502 stops the bypassing of the cooling water toward the radiator 232 when the refrigerant of the air conditioner 100 can be used, for example, when the air conditioner 100 is turned on.

Therefore, when the refrigerant of the air conditioner 100 can be used, the cooling water of the battery module side cooling water circulation line 230 is allowed to cool the battery module B while circulating only between the low-pressure side heat exchanger 220b of the electric component air conditioning unit 220 and the battery module B.

Referring again to FIG. 2, the second refrigerant circulation line 300 includes a compressor 302, a high-pressure side heat exchanger 304, a rear seat left air conditioning unit 310 and a rear seat right air conditioning unit 320, wherein the rear seat left air conditioning unit 310 and the rear seat right air conditioning unit 320 are installed in parallel with each other.

In particular, the rear seat left air conditioning unit 310 and the rear seat right air conditioning unit 320 are used for cooling and heating the rear seat left part and the rear seat right part in the passenger compartment, respectively, and include cooling mode expansion valves 310a and 320a and low-pressure side heat exchangers 310b and 320b, respectively.

The second refrigerant circulation line 300 circulates the refrigerant discharged from the compressor 302 in the air conditioner mode to generate a low-temperature cold air in the low-pressure side heat exchangers 310b and 320b of the rear seat left air conditioning unit 310 and the rear seat right air conditioning unit 320. The generated cold air is supplied to the rear seat left part and the rear seat right part in the passenger compartment to cool the rear seat left part and the rear seat right part.

Meanwhile, the second refrigerant circulation line 300 further includes a water-cooled cooling device 330 for cooling the high-pressure side heat exchanger 304.

The water-cooled cooling device 330 includes a heat exchanger side cooling water circulation line 332. The heat exchanger side cooling water circulation line 332 includes a water pump 334 and a radiator 336.

The heat exchanger side cooling water circulation line 332 circulates cooling water between the high-pressure side heat exchanger 304 of the second refrigerant circulation line 300 and the radiator 336. Accordingly, the heat of the high-pressure side heat exchanger 304 can be dissipated through the radiator 336, thereby cooling the high-pressure side heat exchanger 304.

In this regard, the radiator 336 of the heat exchanger side cooling water circulation line 332 is configured to include a common body 400 shared by the radiator 242 of the electric component module side cooling water circulation line 240 and the radiator 232 of the battery module side cooling water circulation line 230.

At this time, as shown in FIG. 3, the common body 400 includes a heat exchanger cooling region 406 through which the cooling water of the heat exchanger side cooling water circulation line 332 can circulate. The cooling water of the heat exchanger side cooling water circulation line 332 is cooled through the heat exchanger cooling region 406.

In some cases, as shown in FIG. 4, the radiator 336 of the heat exchanger side cooling water circulation line 332 may be formed as a separate body with respect to the radiator 242 of the electric component module side cooling water circulation line 240 and the radiator 232 of the battery module side cooling water circulation line 230.

With the vehicular heat management system according to one embodiment of the present invention having such a configuration, the cooling water of the battery module side cooling water circulation line 230 and the cooling water of the electric component module side cooling water circulation line 240 are independently cooled through the separate radiators 232. Therefore, it is possible to cool the battery module B and the electric component module C having different heat generation temperatures with the independent cooling water circulation structures.

In addition, since the battery module B and the electric component module C having different heat generation temperatures can be cooled with the independent cooling water circulation structures, unlike the conventional technique in which the battery module B and the electric component module C are cooled at the same time through a single cooling water circulation structure, it is possible to significantly improve the cooling efficiency of the battery module B and the electric component module C.

In particular, the battery module B having a relatively low heat generation temperature is cooled by the independent cooling water circulation structure. Therefore, the cooling of the battery module B is not affected by the electric component module C having a relatively high heat generation temperature. Accordingly, it is possible to efficiently cool the battery module B regardless of the electric component module C.

In addition, the plurality of refrigerant circulation lines 200 and 300 for cooling and heating the air conditioning regions of the vehicle is individually shared by the refrigerant circulation lines 200 and 300. Therefore, the supply of the refrigerant of the air conditioning units 210, 220, 310 and 320 for individually cooling and heating the respective air conditioning regions can be shared by the refrigerant circulation lines 200 and 300.

In addition, since the supply of the refrigerant of the air conditioning units 210, 220, 310 and 320 is shared by the refrigerant circulation lines 200 and 300, it is possible to supply a sufficient amount of refrigerant to the respective air conditioning unit 210, 220, 310 and 320.

In addition, since the sufficient amount of refrigerant can be supplied to the respective air conditioning units 210, 220, 310 and 320, it is possible to improve the cooling and heating performance of the respective air conditioning units 210, 220, 310 and 320, thereby improving the cooling and heating performance of the respective air conditioning regions of the vehicle.

In addition, since the supply of the refrigerant to the air conditioning units 210, 220, 310 and 320 is shared by the respective refrigerant circulation lines 200 and 300 and the sufficient amount of refrigerant can be supplied to the respective air conditioning units 210, 220, 310 and 320, it is possible to reduce the operation load applied to the compressors 202 and 302 of the respective refrigerant circulation lines 200 and 300 without reducing the cooling and heating performance of the respective air conditioning units 210, 220, 310 and 320.

In addition, since the operation load applied to the compressors 202 and 302 of the respective refrigerant circulation lines 200 and 300 can be reduced without reducing the cooling and heating performance of the respective air conditioning units 210, 220, 310 and 320, it is possible to improve the durability of the compressors 202 and 302, thereby reducing the risk of malfunction and damage to the compressors 202 and 302 and prolonging the lifespan of the compressors 202 and 302.

While the preferred embodiments of the present invention have been described above, the present invention is not limited to the above-described embodiments. Various modifications and changes may be made without departing from the scope and spirit of the present invention defined in the claims.

What is claimed is:

1. A vehicular heat management system, comprising:
a water-cooled cooling device configured to individually cool a plurality of cooling target objects of a vehicle in a water-cooled manner,
wherein the water-cooled cooling device includes cooling water circulation lines for circulating cooling water between the cooling target objects and radiators, and
the cooling water circulation lines have independent cooling water circulation structures provided in a corresponding relationship with the cooling target objects so as to independently cool the cooling target objects having different heat generation temperatures, and
wherein the water-cooled cooling device includes a battery module side cooling water circulation line for circulating cooling water between a battery module and a first radiator to cool the battery module, and an electric component module side cooling water circulation line for circulating cooling water between an electric component module and a second radiator to cool the electric component module,
wherein the battery module side cooling water circulation line and the electric component module side cooling water circulation line have independent cooling water circulation structures provided in a corresponding relationship with the battery module and the electric component module so as to independently cool the battery module and the electric component module, respectively, and
wherein the first radiator of the battery module side cooling water circulation line and the second radiator of the electric component module side cooling water circulation line have a common body,
wherein the common body includes an electric component module cooling region through which the cooling water of the electric component module side cooling water circulation line can be circulated, and a battery module cooling region through which the cooling water of the battery module side cooling water circulation line can be circulated, and
wherein the battery module side cooling water circulation line is configured to receive a cold air generated in a low-pressure side heat exchanger of an air conditioner in a water-cooled manner, and circulates the received cold air through the battery module in a water-cooled manner to cool the battery module, and
further comprising:
a cooling water flow control part configured to control a flow of the cooling water of the battery module side cooling water circulation line so as to circulate the cooling water between the battery module and the low-pressure side heat exchanger or between the battery module and the first radiator,
wherein the cooling water flow control part is configured to allow one of the cooling water circulating through the low-pressure side heat exchanger and the cooling water circulating through the first radiator to selectively cool the battery module, and
wherein the cooling water flow control part includes a bypass valve configured to bypass the cooling water of the battery module side cooling water circulation line passed through the battery module toward the first radiator, and a return line configured to return the cooling water passed through the first radiator toward the battery module, and the bypass valve is configured to, when the air conditioner is turned on, allow the cooling water passed through the low-pressure side heat exchanger to be introduced into the battery module so that the cooling water is circulated between the low-pressure side heat exchanger and the battery module, and is configured to, when the air conditioner is turned off, bypass the cooling water passed through the battery toward the first radiator so that the cooling water is circulated between the battery module and the first radiator.

\* \* \* \* \*